July 14, 1931.   A. GRIFFITHS   1,814,508

RECEPTACLE CLEANING MEANS

Filed July 8, 1929

A. Griffiths
INVENTOR

By Marks & Clerk
Attys.

Patented July 14, 1931

1,814,508

UNITED STATES PATENT OFFICE

ALFRED GRIFFITHS, OF STRAND, LONDON, ENGLAND, ASSIGNOR TO KLEENGLAS (1929), LIMITED, OF LONDON, ENGLAND, A BRITISH COMPANY

RECEPTACLE CLEANING MEANS

Application filed July 8, 1929, Serial No. 376,645, and in Great Britain August 18, 1928.

This invention has for its object to provide improved and simplified means for washing, drying and polishing domestic utensils, such as tumblers, cups, basins and like hollow-ware, hereinafter referred to, for convenience, as glasses.

The invention relates more particularly to apparatus of the type in which squeegee like elements are caused to bear upon the inside and outside of the glass, the said squeegees being carried by a head which is rotated and may deliver liquid into the glasses for cleansing purposes.

In accordance with my present invention, each pair of squeegees, that is, one acting upon the inside and one acting upon the outside of a glass and opposed to one another, are mounted so as to constitute a unitary structure which can be placed upon and removed from the rotating head as a unit and which can adjust itself to suit the size, shape and taper of the glass being operated upon.

Referring to the accompanying sheet of explanatory drawings:—

Figure 1:
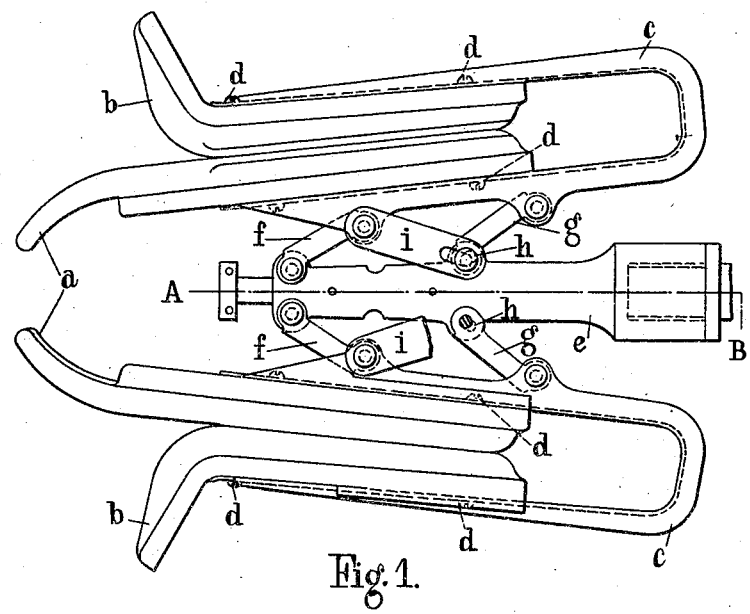
Figure 2:
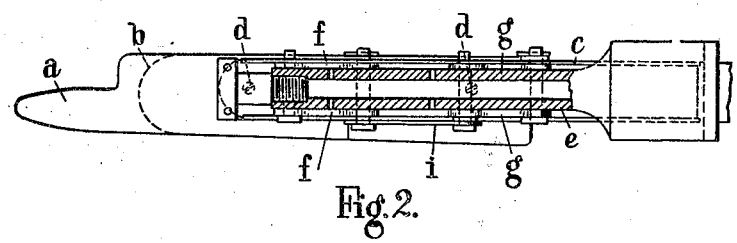

Figure 1 is an elevation and Figure 2 a sectional elevation on the line A B of Figure 1 showing a rotary head for cleaning and polishing glasses constructed in one convenient form in accordance with my invention.

In one form, the squeegees themselves which are lettered $a$ and $b$ in the illustrations may be shaped as in the specification of my prior Patent No. 1,693,780. They are carried upon the legs of U shaped elements $c$. The means of attachment of the squeegees to the legs of the elements $c$ may consist of screws $d$ which pass through such legs and into the metal reinforcing plate within each squeegee. Each element is strong and relatively rigid so that the legs are at a fixed distance apart.

Each U member $c$ with its two squeegees $a$ and $b$ constitutes a unitary structure which can be rotated from the central stem $e$ constituting the rotary part of the head by being connected thereto by links $f$, $g$ pivoted to the U member and to the stem. The connection between the links $g$ and the stem or the U elements may be by elongated slots $h$ to permit the elements to take up an angular position in accordance with the shape of the glass or articles being cleaned. The amount of movement of the elements $c$ away from the stem $e$ may be limited by links $i$ having elongated slots therein at one end. Different lengths of links may be employed for different ranges of sizes of glasses or other articles to be cleaned. In Figure 1, the lower link $i$ is cut away to show more clearly the elongated slot in the link $g$.

As each unit can move freely towards or away from the stem $e$, they can adjust themselves readily to suit any particular size or taper of glass. The squeegees themselves may be made sufficiently resilient to suit glasses of barrel or other shape. The outer ends of the squeegees are tapered outwards and inwards respectively as shown to facilitate the insertion of the glasses upon the rotating heads.

Any number of unitary structures comprising two squeegees upon or forming part of a U shaped element may be carried by one rotating stem.

I may vary the details of construction of the elements and squeegees and of the means for attaching the same together and to the head $e$ without departing from the scope of my invention.

What I claim is:—

1. Means for washing, drying and polishing tumblers and like articles, comprising, in combination, a rotatable hollow and perforated stem, pairs of links pivotally connected to said stem, one link of each pair having an elongated hole at its pivoted point. U shaped elements each pivotally atached to one pair of said links, squeegees secured to the inner side of each leg of the U elements, and means limiting the movements of said U elements away from said stem under centrifugal force.

2. Means for washing, drying and polishing tumblers and like articles, comprising in combination, a rotatable hollow and perforated stem, two pairs of links pivotally connected to said stem at diametrically opposite sides, one link of each pair having an elongated hole at one of its pivoted points, a U shaped element connected to each pair of said links, squeegees secured to the inner side of each leg of the U elements, each squeegee projecting beyond the end of the U element and diverging from the other of its pair where it projects, and a link connecting the pivot point of one link of each pair to the stem to the pivot point of the other link of said pair to the U element so as to permit a limited amount of movement of said pivot points away from one another.

In testimony whereof I have signed my name to this specification.

ALFRED GRIFFITHS.